(12) United States Patent
Lee

(10) Patent No.: US 7,070,119 B2
(45) Date of Patent: Jul. 4, 2006

(54) VEHICLE HEATER CONTROL APPARATUS AND METHOD FOR CONTROLLING THE SAME

(75) Inventor: Dae Woo Lee, Ulsan (KR)

(73) Assignee: Hyundai Motor Company, Seoul (KR)

( * ) Notice: Subject to any disclaimer, the term of this patent is extended or adjusted under 35 U.S.C. 154(b) by 201 days.

(21) Appl. No.: 10/750,656

(22) Filed: Dec. 31, 2003

(65) Prior Publication Data
US 2005/0077367 A1    Apr. 14, 2005

(30) Foreign Application Priority Data
Oct. 11, 2003    (KR)    ........................ 10-2003-0070804

(51) Int. Cl.
*B60H 1/02* (2006.01)
(52) U.S. Cl. ........................ 237/12.3 R; 237/12.3 B; 237/2 A; 165/41
(58) Field of Classification Search ............ 237/12.3 B, 237/12.3 R, 2 A; 165/41, 42
See application file for complete search history.

(56) References Cited

U.S. PATENT DOCUMENTS

| | | | | |
|---|---|---|---|---|
| 5,255,733 A | * | 10/1993 | King ........................... | 165/299 |
| 5,291,960 A | * | 3/1994 | Brandenburg et al. ...... | 180/65.2 |
| 5,816,495 A | * | 10/1998 | Ito ......................... | 237/12.3 R |
| 5,906,177 A | * | 5/1999 | Okabe et al. ................. | 122/26 |
| 6,037,567 A | * | 3/2000 | Inoue et al. ................ | 219/202 |
| 6,109,219 A | * | 8/2000 | Sano ......................... | 123/41.1 |
| 6,383,672 B1 | * | 5/2002 | Fujita ........................ | 429/26 |
| 6,448,535 B1 | * | 9/2002 | Ap .............................. | 219/208 |
| 6,604,576 B1 | * | 8/2003 | Noda et al. ................. | 165/202 |

FOREIGN PATENT DOCUMENTS

| | | |
|---|---|---|
| JP | 06-328930 | 11/1994 |
| JP | 2002-283826 | 3/2002 |
| JP | 2003-104041 | 9/2003 |

* cited by examiner

*Primary Examiner*—Derek S. Boles
(74) *Attorney, Agent, or Firm*—Morgan Lewis & Bockius LLP

(57) ABSTRACT

In a heater control apparatus for a vehicle and a method for controlling the same, an engine control part controls a cooling water conduit control part so that the opening of a cooling water bypass is variably regulated in proportion to an interior temperature thereby increasing the efficiency of air conditioning of a vehicle.

9 Claims, 5 Drawing Sheets

VEHICLE HEATER CONTROL APPARATUS AND METHOD FOR CONTROLLING THE SAME

CROSS-REFERENCE TO RELATED APPLICATIONS

This application claims priority of Korean Application No. 10-2003-0070804, filed on Oct. 11, 2003, the disclosure of which is incorporated fully herein by reference.

FIELD OF THE INVENTION

The present invention relates to a heater control apparatus for a vehicle and a method for controlling the same and, more particularly, to such a method and apparatus in which a cooling water bypass is variably regulated in proportion to the interior temperature, thereby maximizing the cooling efficiency of the vehicle.

BACKGROUND OF THE INVENTION

Most vehicles are provided with a heating apparatus to maintain a comfortable internal environment wherein internal air is heated using engine cooling water at high temperature. The cooling water heated by the engine is transferred to a heater core through a cooling water pump. Then, external air or internal air is heated by a blower and delivered into the vehicle.

There have been proposed many heating apparatuses for a vehicle which employ the above-mentioned heating principle with additional functions to improve the efficiency of the heating. For example, Japanese Patent Publication No. 2003-104041 discloses a fluid heating apparatus to improve the heating capability and capacity of a vehicle by installing an additional fluid heating apparatus at the inlet of a heater core. Further, Japanese Patent Publication No. 2002-283826 discloses an air conditioning apparatus for a vehicle which independently controls the temperature in front and rear seats using a bypass and an air mix door. Further, Japanese Patent Publication No. 2002-283826 discloses an air conditioning apparatus for a vehicle to obtain sufficient conditioning effect at the bi-level mode. Also, Japanese Patent Publication No. 6-328930 discloses a heating apparatus for a vehicle in which the inside of the vehicle and an engine can be promptly heated by supplying high temperature cooling water saved in a thermo vessel to the inside of the vehicle or the engine.

As is shown in the prior art, heaters are basically designed to provide warm or hot air. Therefore, when an engine is under operation, cooling water automatically flows into a heater core through conduits. However, this still holds true even during the summer when it is hot or the interior temperature of the vehicle is above the preset standard temperature. Consequently, if fresh high temperature cooling water flows into the heater core and is circulated, heat is continuously irradiated toward the outside of the heater core case, thereby continuously increasing the interior temperature. Further, considering that air conditioning is controlled by way of on-off of an air conditioner switch, the interior temperature of a vehicle will be increased according to the increase in interior of the vehicle if the air conditioner is not in a proper working condition or if is on an off position.

Therefore, when the interior of a vehicle is below a preset standard temperature with the temperature controlling lever placed at a cooling side, all cooling water passes through the heater core thus resulting in decrease in cooling efficiency.

Therefore, there has been a need for the development of a new method to solve the above-mentioned problems.

SUMMARY OF THE INVENTION

Embodiments of the present invention provide a vehicle heater control apparatus and a method for controlling the same, which can maximize the air conditioning efficiency of a vehicle by controlling a cooling water conduit control part so that the opening amount of a cooling water bypass can be variably regulated in accordance with the interior temperature of the vehicle.

In an embodiment of the present invention, a vehicle heater control apparatus comprises a heater core case, a temperature control lever, a temperature control lever angle sensor and an interior temperature sensor. The vehicle heater control apparatus further comprises a cooling water bypass extending between a cooling water inlet conduit and a cooling water outlet conduit in the heater core case. The cooling water inlet conduit fluidly communicates with the cooling water outlet conduit through the cooling water bypass. An engine control part outputs a control signal in order to control an opening mode of the conduits depending on the result of the signal comparison after comparing a signal generated from the temperature control lever angle sensor and a signal generated from a sensor monitoring the interior temperature with reference to corresponding setpoint values. A relay is turned on in accordance with a control signal generated from the engine control part. A cooling water conduit control part for allowing the cooling water to bypass via the cooling water bypass in accordance with the control signal generated from the engine control part after the relay is turned-on, the cooling water conduit control part being installed in the cooling water bypass.

In a preferred embodiment, if the signals sensed by the temperature control lever angle sensor are greater than 0° (that is, in heating mode) and the signals sensed by the interior temperature sensor are above 20° C., the engine control part does not output the controlling signals in order to form a normal cooling water conduit. If the signals sensed by the temperature control lever angle sensor are smaller than 0° (that is, in air conditioning mode) and the signals sensed by interior temperature sensor are below 20° C., the engine control part outputs the signals for controlling the conduit so that the cooling water is bypassed.

Further, the cooling water conduit control part preferably comprises a supporting bearing for supporting the cooling water bypass at upper and lower portions thereof. A cylindrical guide bar is inserted in the supporting bearing. The solenoid coil is formed on the outside of the guide bar and thus forms a magnetic field according to the signals being output from the relay. First and second conduit magnetic regulators move according to the magnetic field formed by the solenoid coil. The stopper is formed intermediate of the guide bar for supporting the first and second magnetic regulator. First and second magnetic regulator springs return the first and second magnetic regulators to the original position. First and second conduit guide pins bypass the cooling water which is pushed by the first and second magnetic regulators. First and second conduit guide pin springs return the first and second conduit guide pins to the original position when the first and second magnetic regulator springs are returned.

In a further alternative preferred embodiment, the first and second magnetic regulators are formed with the rolling wheel on the end portion thereof. Also, one side of the first and second magnetic regulator springs are fixed to the first and second magnetic regulators, respectively, while another side is fixed to the stopper, respectively. Preferably, one side of the first and second conduit guide pin springs are fixed to the first and second conduit guide pins, respectively, while another side is fixed to the upper portion of the bypass part. Further, the heater controlling apparatus includes a switch for removing the electric current remaining at the solenoid coil when the signals, which are output from the relay, are isolated.

In a method for heater control for a vehicle according to the present invention, the apparatus that is controlled may comprise a cooling water bypass which is formed by pipe-connecting conduits of the heater core case, an engine control part for outputting the control signals according to the signals of a temperature control lever angle sensor and the interior temperature sensor, a relay which is turned on according to the control signals which are output from the engine control part, and a cooling water conduit control part for controlling the cooling water that is bypassed according to the controlling signals of the engine control part when the relay is turned on in the cooling water bypass.

While not limited to use with the above-described apparatus, a method according to the invention includes a first step for determining that the interior temperature sensed by the interior temperature sensor is higher than a first preset standard temperature after the signal corresponding to the air conditioning mode is input from the temperature control lever angle sensor. A second step determines whether the interior temperature is over the pre-set second preset standard temperature if the interior temperature is higher than the first preset standard temperature. A third step controls the cooling water conduit control part so that the cooling water input/output conduits are fully closed and the cooling water bypass is fully opened if the interior temperature is over the second preset standard temperature. A fourth step controls the cooling water conduit control part in order that the opening amount of the cooling water bypass is increased in proportion to the increasing of the interior temperature when the relay is turned on.

Preferably, in the fourth step, the opening position of the first and second conduit guide pins is controlled by varying the voltage, which passes the solenoid coil of the cooling water conduit control part via the relay. Further, the first preset standard temperature is preferably about −5° C. and the second preset standard temperature is preferably about 20° C.

BRIEF DESCRIPTION OF THE DRAWINGS

The above object and other characteristics and advantages of the present invention will become more apparent by describing in detail a preferred embodiment thereof with reference to the attached drawings, in which.

DETAILED DESCRIPTION OF THE INVENTION

Hereinafter, a heater control apparatus and method for a vehicle according to preferred embodiments of the present invention will be explained in detail with reference to the accompanying drawings.

Figure 1:
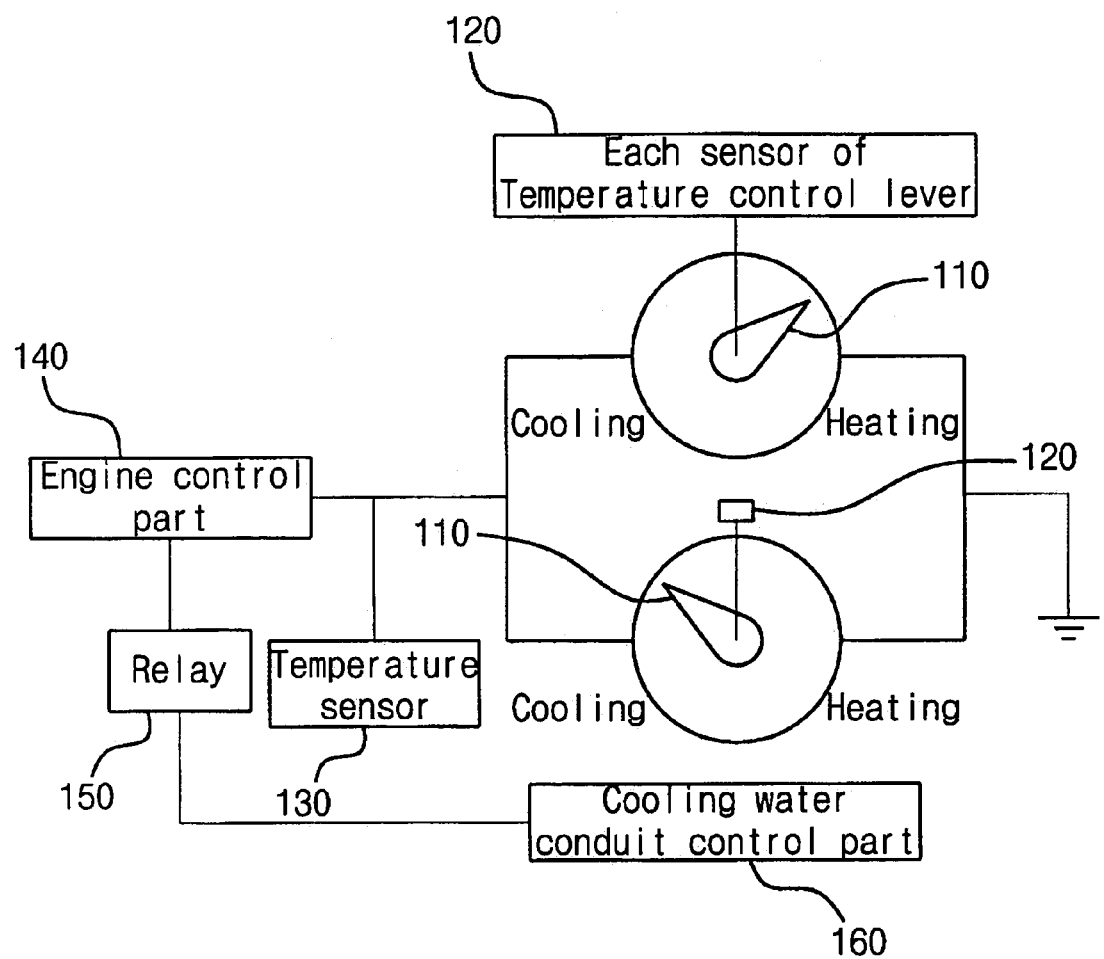
FIG. 1 is a schematic view showing the structure of a heater control apparatus according to a preferred embodiment of the present invention.
Figure 2:
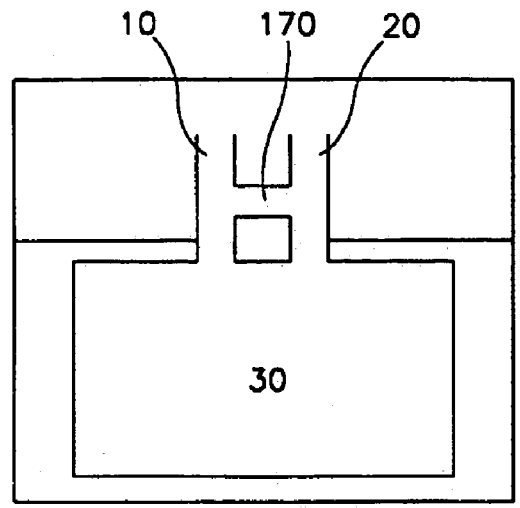
FIG. 2 is a schematic view showing a bypass in a cooling water conduit in the heater core of a heater control apparatus according to a preferred embodiment of the present invention.

As shown in FIG. 1, a heater control apparatus according to an embodiment of the present invention includes a temperature control lever 110, a temperature control lever angle sensor 120, an interior temperature sensor 130, an engine control part 140, a relay 150, and a cooling water conduit control part 160. As further illustrated in FIG. 2, an apparatus according to the present invention further includes conduits 10 and 20 communicating with heater core 30. The conduits selectively communicate via bypass 170.

The temperature control lever 110 selects heating or air conditioning of the inside of a vehicle according to the driver's selection. The temperature control lever angle sensor 120 senses the angle of the temperature control lever 110. The interior temperature sensor 130 senses the interior temperature of the vehicle when the heating or air conditioning is selected. The engine control part 140 outputs signals for controlling the cooling water conduits 10 and 20 according to the signals sensed by the temperature control lever angle sensor 110 and the interior temperature sensed by the interior temperature sensor 130. The relay 150 is turned on according to the control signals output from the engine control part 140.

Engine control part 140 and cooling water conduit control part 160 may comprise processors, memory and other associated hardware as may be selected and programmed by persons of ordinary skill in the art based on the teachings contained herein.

The conduit for the cooling water is controlled by the cooling water conduit control part 160 in order to bypass water according to the control signals from the engine control part 140. The cooling water conduit control part 160 is formed in the cooling water conduit bypass 170, which will be explained later.

Figure 3A:
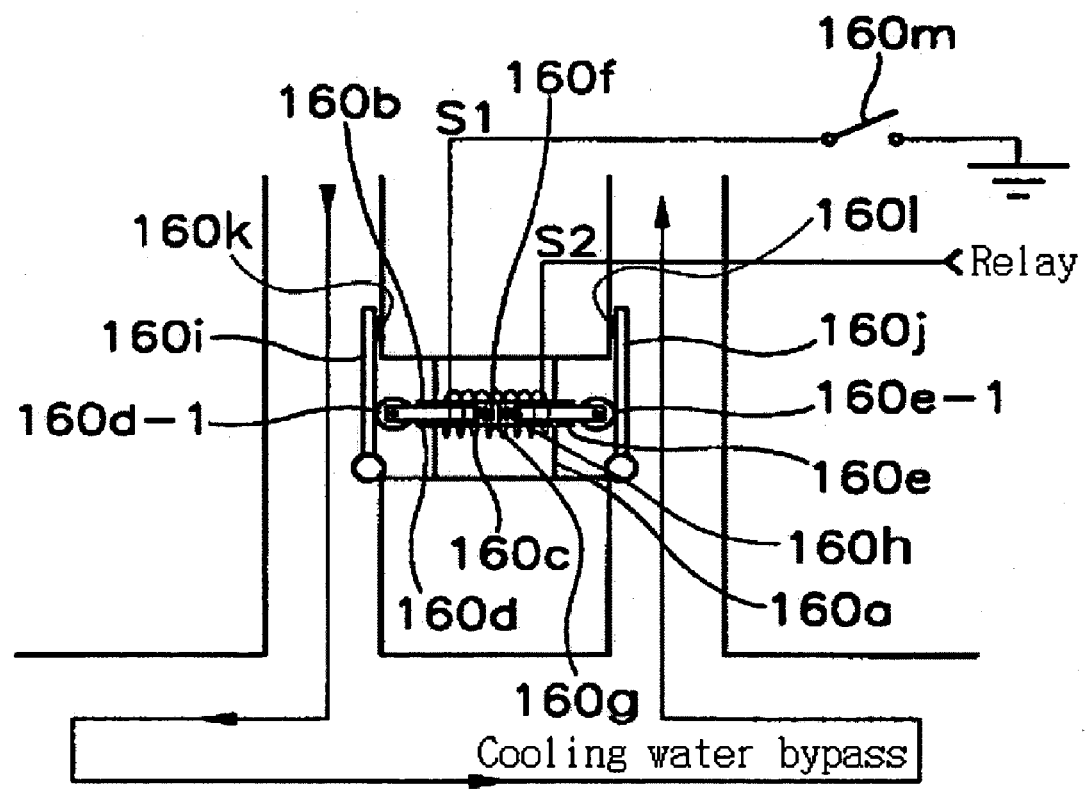
FIGS. 3a and 3b are schematic views showing the detailed structure of the cooling water control part installed in the bypass in FIG. 3 and showing the cooling water conduit according to the control of the engine control part.
Figure 3B:
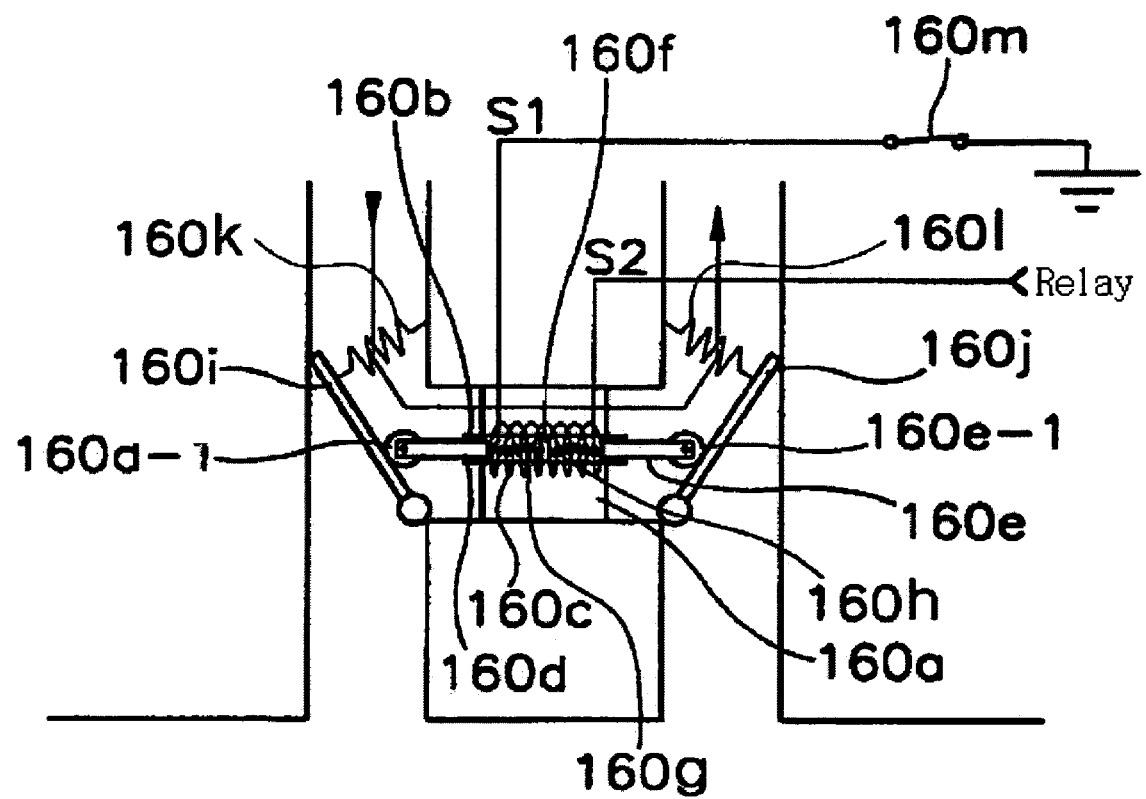

As shown in FIGS. 3a and 3b, the cooling water conduit control part 160 includes a support bearing 160a for supporting the cooling water bypass at the upper and lower portions thereof. A cylindrical guide bar 160b is inserted in the support bearing 160a. The solenoid coil 160c is formed on the outside of the guide bar 160b for forming a magnetic field according to the signals output from the relay 150. First and second conduit magnetic regulators 160d and 160e, move based on the magnetic field formed by the solenoid coil 160c. The stopper 160f is formed in the intermediate portion of the guide bar 160b and supports the first and second magnetic regulators 160d and 160e. First and second magnetic regulator springs 160g and 160h return the first and second magnetic regulators 160d and 160h to the original positions, respectively. First and second conduit guide pins 160i and 160j are pushed by the first and second magnetic regulators 160d and 160e for bypassing the cooling water, and first and second conduit guide pin springs 160k and 160l return the first and second conduit guide pins 160*i* and 160*j* when the first and second magnetic regulator springs 160*g* and 160*h* are returned.

The first and second magnetic regulators 160*d* and 160*e* are preferably formed with rolling wheels 160*d*-1 and 160*e*-1 on the end portion thereof. One side of the first and second magnetic regulators 160*g* and 160*h* is fixed to the first and second magnetic regulators 160*d* and 160*e*, and another side thereof is fixed to the stopper 160*f*, respectively. One side of the first and second conduit guide springs 160*k* and 160*l* is fixed to the first and second conduit guide pins 160*i* and 160*j*, and another side thereof is fixed to the upper side of the bypass part 170.

A heater control apparatus of the present invention further includes a switch 160*m* for removing the electric current remaining in the solenoid coil 160*c* when the output signals are isolated.

Figure 4:
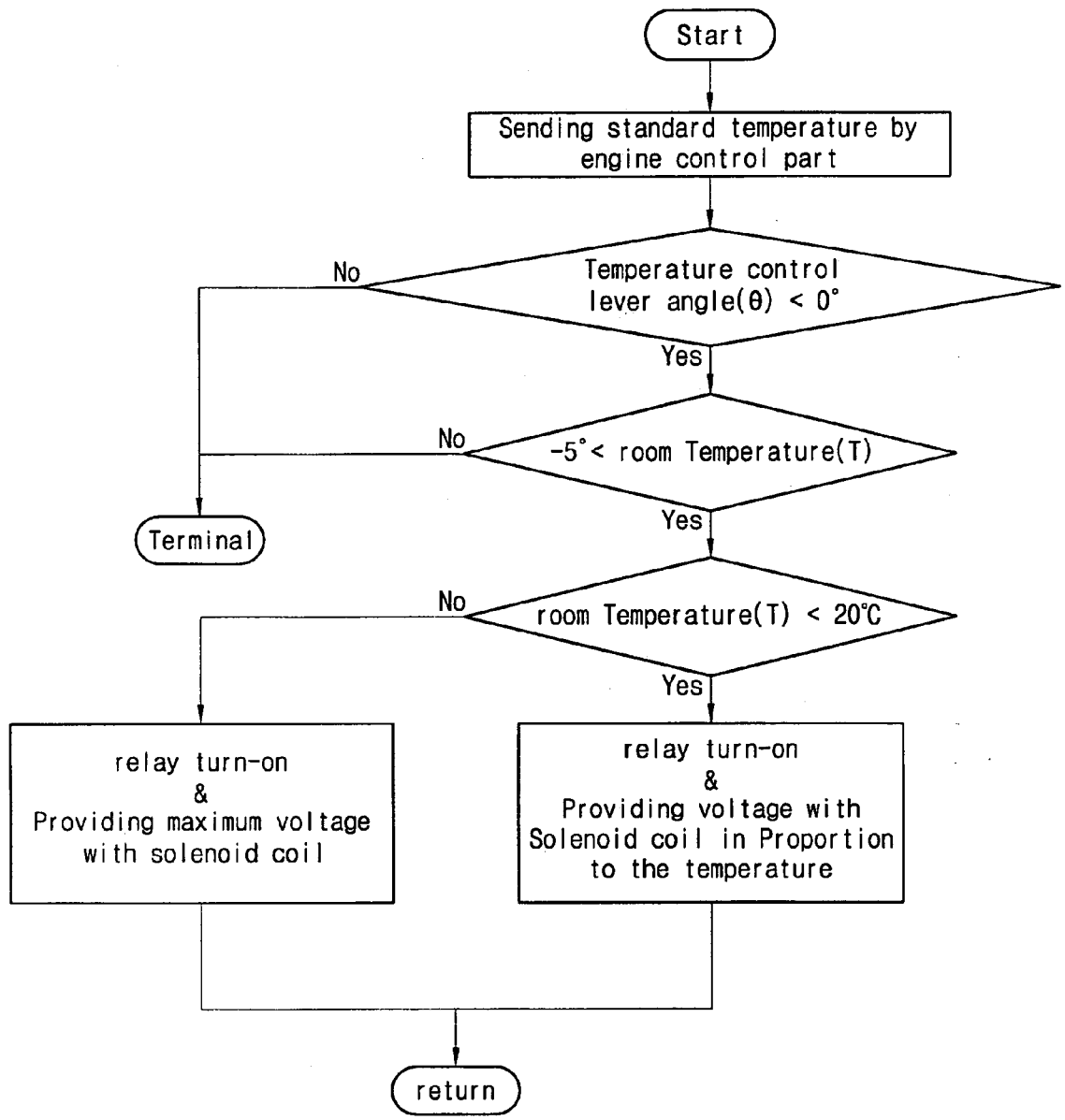
FIG. 4 is a flow chart illustrating a control method of a preferred embodiment of the present invention.

The operating of the heater control apparatus for a vehicle having the above-described structure will be explained referring to the drawings, in particular, the flow chart of FIG. 4.

First, the temperature control lever 110 is set in order to select heating or air conditioning of the inside of a vehicle. Then, the temperature control lever angle sensor 120 senses the angle by the controlling of the temperature control lever 110 and outputs it. The temperature control lever angle sensor 120 is pre-set to θ1>0, if under heating, and is pre-set to θ2<0, if under air conditioning. The interior temperature sensor 130 senses the interior temperature of a vehicle when the heating or air conditioning is selected.

The engine control part 140 outputs the signals for controlling the cooling water conduit based on the signals sensed by the temperature control lever angle sensor 120 and the interior temperature sensed by the interior temperature sensor 130. That is, if the signals sensed by the temperature control lever angle sensor 120 are greater than 0° C. (heating) and the signals sensed by the interior temperature sensor 130 are over 20° C., the engine control part 140 does not output the control signals and a normal cooling water conduit is formed.

Consequently, the relay 150 is turned off when the control signals are not output from the engine control part 140. Therefore, as shown FIG. 2, the cooling water control part 160 formed in the cooling water bypass 170 which is connected to the cooling input/output conduits 10 and 20 of the heater core case is not operated. As shown FIG. 3*a*, cooling water is normally moved through the input/output conduits 10 and 20 of the heater core case and the core 30.

If the signals sensed by the temperature control lever angle sensor 120 are smaller than 0° C. (air conditioning) and the signals sensed by the interior temperature sensor 130 are below 20° C., the engine control part 140 outputs the signals for controlling the conduit so that the cooling water is bypassed without being passed through the heater.

The relay 150 is turned on according to the control signals output from the engine control part 140. Thereby, the cooling water control part 160 controls the conduit of the cooling water in order that the cooling water is bypassed according to the control signals of the engine control part 140.

The cooling water bypass 170 controls the conduit of the cooling water so that cooling water is bypassed according to the control signals of the engine control part 140. That is, the solenoid coil 160*c* forms a magnetic field according to the control signals of the engine control part 140 and generates a repulsive force. Then, the first and second conduit magnetic regulators 160*d* and 160*e*, respectively move to the left and right through the cylindrical guide bar 160*b*. The rolling wheels 160*d*-1 and 160*e*-1, respectively formed on the end portion of the first and second conduit magnetic regulators 160*d* and 160*e*, push the first and second conduit guide pins 160*i* and 106*j*, as shown in FIG. 4*b* abd the cooling water is bypassed. Then, the cooling water flowing into the core 30 through the input/output conduits 10 and 20 of the heater core case is isolated.

The engine control part 140 does not output the control signals if the signals sensed by the temperature control lever angle sensor 120 are greater than 0° (heating, condition) and the signals sensed by the interior temperature sensor 130 are over 20° C., so that the normal cooling water conduit is formed. Then, the relay 150 is turned off since the control signals output from the engine control part 140 are not output, thereby preventing the generation of a magnetic field by the solenoid coil 160*c* of the cooling water conduit control part 160.

The first and second magnetic regulators 160*d* and 160*e* are returned to the original position by the first and second magnetic regulator springs 160*g* and 160*h*. The springs 160*g* and 160*h* are formed in an intermediate portion of the cylindrical guide bar 160*b* inserted in the supporting bearing 160*a* for supporting the upper and lower portion of the cooling water bypass 170. Further, one side of the springs 160*g* and 160*h* is fixed to the first and second magnetic regulators 160*d* and 160*e* of the cooling water conduit control part 160. Further, another side of the springs 160*g* and 160*h* is fixed to the stopper 160*f* for supporting the first and second magnetic regulators 160*d* and 160*e*.

The first and second conduit guide pins 106*i* and 160*j* are returned to the original position by the first and second conduit guide pin springs 160*k* and 160*l*. One side of the pins 106*i* and 160*j* is fixed to the first and second conduit guide pins 106*i* and 160*j*, and another side thereof is fixed to the upper side of the bypass part 170. Meanwhile, a driver can remove electric current remaining in the solenoid coil 160*c* by isolating the signals outputted from the relay 150 by operating the switch 160*m*.

The heater controlling apparatus of the present invention bypasses cooling water, which is variably regulated according to the interior temperature of a vehicle. What is specifically meant by "the amount of the cooling water being bypassed is variably regulated according to the interior temperature of a vehicle" is that the amount of the cooling water flowing into the heater core is variably regulated. That is, in the present invention, only the amount of the cooling water being regulated according to the interior temperature of a vehicle is bypassed, and the remaining cooling water flows into the heater core. Therefore, not the entire cooling water flows into the heater core under the standard temperature after air conditioning.

As explained above, in the present invention, the amount of cooling water which flows into the heater core 30 is regulated by regulating the amount of the cooling water being bypassed. Further, the amount of cooling water being bypassed in the heater controlling apparatus is varied according to the opening angle of the first and second guide pins 160*i* and 160*j*.

In the present invention, if the temperature control lever 10 is under air conditioning mode and the interior temperature of a vehicle is below the preset standard, unlike as in prior art, the opening angle α of the first and second conduit guide pins 160*i* and 160*j* is controlled by the engine control part 140 variably according to the signals input from the interior temperature sensor 130 thereby allowing bypass of the regulated amount of cooling water according to the interior temperature and also allowing the remaining cooling water to be flowed into the heater core 30.

Further, if the temperature control lever is in the air conditioning mode and the interior temperature is over the preset standard, as in prior art, the cooling water bypass is filly opened, whereby the whole cooling water is bypassed. The first and second guide pins 160*i* and 160*j* are controlled so that the inlet and outlet of the cooling bypass 170 are fully opened and the inlet and outlet of the inner conduit of the heater conduit 30 are fully closed.

As shown in FIG. 3*b*, the opening angle α of the first and second conduit guide pins 160*i* and 160*j* refers to the opening position of the two conduit guide pins 160*i* and 160*j* when the corresponding magnetic regulators 160*d* and 160*e* are moved left and right by the magnetic field formed in the solenoid coil 160*c* in the condition in which two conduit guide pins 160*i* and 160*j* are fully opened. That is, the opening angle α refers to the slanted angle. This means the opening amount of the inlet and outlet of the cooling water bypass 170.

If the opening angle α of the first and second conduit guide pins 160*i* and 160*j* is 0°, the inlet and outlet of the cooling water bypass 170 are fully closed. Further, in a condition in which the inlet and outlet of the cooling water bypass 170 are opened at its maximum, the opening angle α is greatest and the inlet and outlet of the inner conduit of the heater core 30 are fully closed.

In the present invention, the engine control part 140 controls the voltage being applied to the solenoid coil 160*c* through the relay 150 base on the temperature signals being input from the interior temperature sensor 130, so that the opening amount of the inlet and outlet of the cooling water bypass 170 (that is, the opening angle α of the first and second conduit guide pins 160*i* and 106*j*) varies according to the interior temperature of a vehicle.

If the voltage being applied to the solenoid coil 160*c* is varied, the repulsive force being formed by the magnetic field is varied. Therefore, the greater the applied voltage is, the greater the repulsive force is. If the repulsive force is greater, the first and second magnetic regulators 160*d* and 160*e* make movements to left and right. Therefore, if the conduit guide pins 160*i* and 160*j* make bigger movements, the opening angle α becomes greater.

Figure 5A:
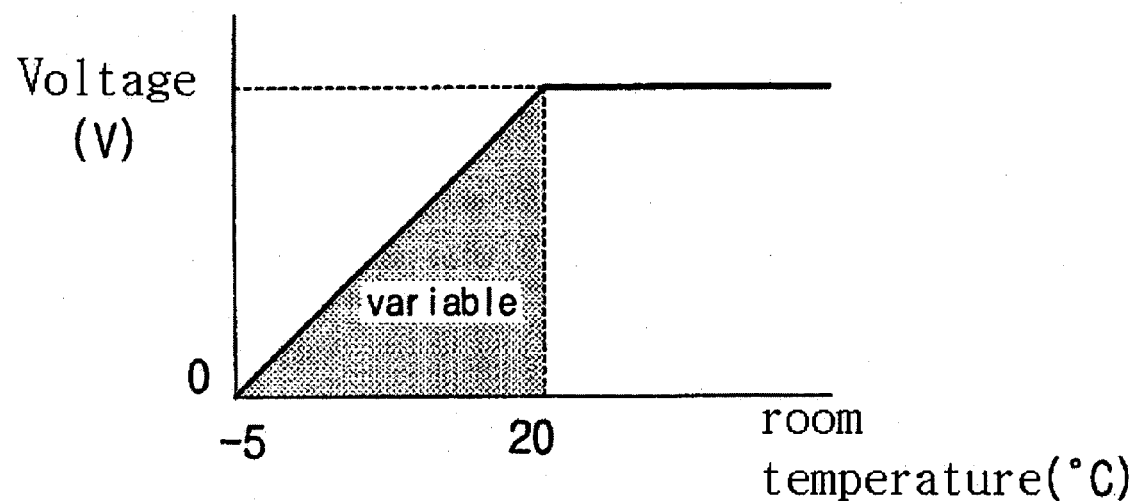
FIG. 5a is a graph showing a relationship between the interior temperature and the voltage applied to the solenoid coil according to a preferred embodiment of the present invention.

In the present invention, as shown in FIG. 5*a*, if the interior temperature sensed by the interior temperature sensor 130 is within a pre-set temperature region below the preset standard temperature, the engine control part 140 applies a relatively higher voltage to the solenoid coil 160*c* as the interior temperature becomes higher. That is, if a preset standard temperature (hereinafter referred to as second temperature, T2) is 20° C. and an another preset standard temperature, which is lower, (hereinafter referred to as first temperature, T1) is −5° C., in the temperature region of −5° C.<T<20° C., the engine control part 140 controls the application of the voltage to the solenoid coil 160*c* in proportion to the increase in the interior temperature being sensed by the interior temperature sensor 130.

Figure 5B:
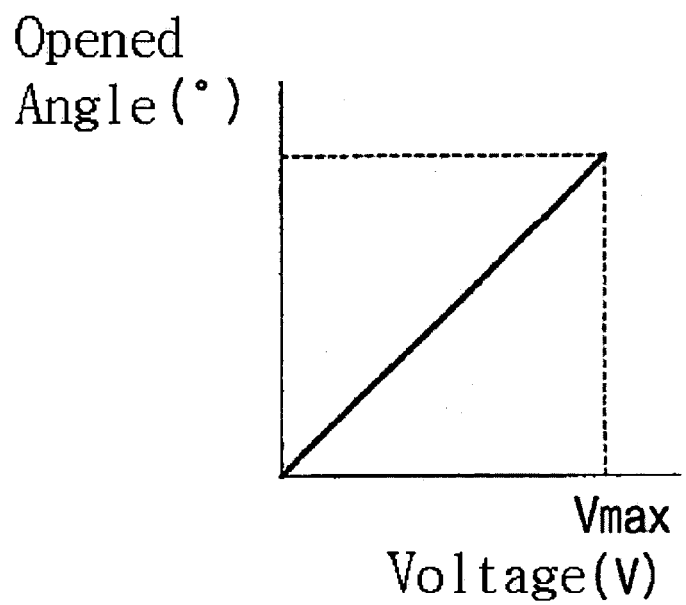
FIG. 5b is a graph showing a relationship between the voltage applied to the solenoid coil and the open angle of the guide pin of the first and second conduit.

As shown in FIG. 5*b*, as the applied voltage becomes higher, the repulsive force according to the magnetic field is increased. Therefore, the opening angle α of the conduit guide pins 160*i* and 160*j* is determined according to the position of each magnetic regulator 160*d* and 160*e*, and more cooling water is bypassed.

Hereinafter, the method for controlling the heater controlling apparatus will be explained in detail.

Basically, the engine control part 140 receives the signals from the temperature control lever angle sensor 120 and the interior temperature sensor 130. If the engine control part 140 receives the signals in which the temperature control lever angle is smaller than 0° C. (air conditioning mode) from the temperature control lever angle sensor 120, it determines whether the interior temperature T sensed by the interior temperature sensor 130 is greater than the first preset standard temperature T1, that is, −5° C.

If the interior temperature T is greater than −5° C., the engine control part 140 determines whether the interior temperature T is over the second preset standard temperature T2, that is, 20° C.

If the interior temperature T is over −5° C. and below 20° C., together with the turning on of the relay 150, the engine control part 140 controls the voltage being applied to the solenoid coil 160*c* in proportion to the increase of the temperature in the temperature region, −5° C.<T<20° C.

The engine control part 140 applies to higher voltage of the solenoid coil 160*c* if the interior temperature T is within the temperature region. Therefore, the higher the voltage of the solenoid coil 160*c* being applied, the greater the repulsive force formed by a magnetic field is. Further, as each of magnetic regulators 160*d* and 160*e* is moved more heavily, the opening angle α of each of conduit guide pins 160*i* and 160*j* becomes greater.

Finally, the regulated amount of cooling water according to the interior temperature is bypassed, and the remaining cooling water is passed through the inside of the heater core 30.

Meanwhile, if the interior temperature T is over 20° C., the engine control part 140 applies the greatest voltage to the solenoid coil 160*c* together with the turning of the relay 150, whereby each conduit guide pins 160*i* and 160*j* is opened at its maximum, and then the inlet and outlet of the inner conduit of the heater core 170 are fully closed. Finally, the whole cooling water is bypassed through the cooling water bypass 170 without passing through the inside of the heater core 30.

As mentioned above, in the present invention, the engine control part determines whether the interior temperature of a vehicle is below the second preset standard temperature and controls the cooling water conduit control part, so that the opening amount of the cooling water bypass is variably regulated in proportion to the interior temperature, thereby maximizing the efficiency of the air conditioning of a vehicle.

According to the present invention, if the interior temperature of a vehicle is over the second preset standard temperature, 20° C., the engine control part controls the whole cooling water to be fully bypassed. Further, if the interior temperature is below the second preset standard temperature, the amount of the cooling water passing through the inside of the heater core according to the interior temperature is variably regulated thereby maximizing the efficiency of the air conditioning of a vehicle.

Namely, if the interior temperature is over the second preset standard temperature, the whole cooling water is fully bypassed, and thereby the decrease in the efficiency of the air conditioning caused by the irradiating heat of the heater core may be prevented. Further, if the interior temperature is below the second preset standard temperature, the amount of cooling water being regulated according to the interior temperature is bypassed. Therefore, the decrease in efficiency of the air conditioning of a vehicle may be effectively prevented.

Further, when the interior temperature is below the second preset standard temperature, the flow resistance caused during passing in the heater core may be decreased by regulating the amount of the cooling water being flowed into the heater core to be smaller than the amount that in prior art, i.e., 100%, thereby reducing the output loss.

While the present invention has been particularly shown and described with reference to particular embodiments thereof, it will be understood by those skilled in the art that various changes in forms and details may be effected therein without departing from the spirit and scope of the invention as defined by the appended claims.

What is claimed is:

1. A heater control apparatus for a vehicle provided with a heater core case, a temperature control lever, a temperature control lever angle sensor, an interior temperature sensor, wherein said vehicle heater control apparatus comprises:

a cooling water bypass extending between a cooling water inlet conduit and a cooling water outlet conduit in the heater core case, the cooling water inlet conduit being in fluid communication with the cooling water outlet conduit through the cooling water bypass;

an engine control part for outputting a control signal in order to control an opening mode of the conduits comparing a signal generated from the temperature control lever angle sensor and a signal generated from the interior temperature sensing sensor with reference to corresponding set-point values;

wherein the engine control part outputs a control signal corresponding to a normal state of the conduits when the control signal generated from the temperature control lever angle sensor is higher than 0° C., and simultaneously the control signal generated from the interior temperature sensing sensor is above 20° C.;

and wherein the engine control part outputs a control signal corresponding to the opening mode of the cooling water bypass when the control signal generated from the temperature control lever angle sensor is below 0° C., and simultaneously the control signal generated from the interior temperature sensing sensor is below 20° C. in order to bypass the cooling water without passing through the heater core;

a relay controlled in accordance with the control signal generated from the engine control part; and a cooling water conduit control part for allowing the cooling water to be bypassed via the cooling water bypass in accordance with the control signal generated from the engine control part after the relay is turned on, the cooling water conduit control part being installed in the cooling water bypass.

2. The vehicle heater control apparatus according to claim 1, wherein the cooling water conduit control part comprises:

a support bearing for supporting the cooling water bypass upwards and downwards;

a cylindrical guide bar being inserted into the support bearing;

a solenoid coil for forming a magnetic field in accordance with a signal generated from the relay, the solenoid coil being wound around an outer surface of the guide bar;

first and second magnetic conduit controllers being moveable from initial positions with respect to the conduits in accordance with the magnetic field created by the solenoid coil;

a stopper for supporting the first and second conduit magnetic controllers being installed at a center of the guide bar;

first and second magnetic controller springs for returning the first and second conduit magnetic controllers to their initial positions;

first and second conduit guide pins for bypassing the cooling water while pushed from initial positions by the first and second conduit magnetic controllers; and first and second conduit guide pin springs for returning first and second conduit guide pins to their initial positions during the returning of the first and second magnetic controller springs.

3. The vehicle heater control apparatus according to claim 2, wherein a rolling wheel is installed at ends of the first and second magnetic conduit controllers, respectively.

4. The vehicle heater control apparatus according to claim 2, wherein an end of the first and second magnetic controller springs is respectively fixed to the first and second magnetic conduit controllers while another end of the first and second magnetic controller springs is fixed to a stopper.

5. The vehicle heater control apparatus according to claim 2, wherein ends of the first and second conduit guide pin springs are fixed to the first and second conduit guide pins while another end of the first and second conduit guide pin springs are fixed to an upper side of the cooling water bypass.

6. The vehicle heater control apparatus according to claim 1, wherein said vehicle heater control apparatus further comprises a switch for removing an electric current which remains at the solenoid coil after cutting-off the signal generated from the relay.

7. A method for controlling a vehicle heater control apparatus comprising a cooling water bypass extending between a cooling water inlet conduit and a cooling water outlet conduit in the heater core case, an engine control part for outputting a control signal based on comparing a signal generated from the temperature control lever angle sensor and a signal generated from the interior temperature sensing sensor with corresponding set-point values, a relay being turned on in accordance with a control signal generated from the engine control part, and a cooling water conduit control part for allowing the cooling water to be bypassed via the cooling water bypass in accordance with the control signal generated from the engine control, the method comprising:

determining whether an interior temperature sensed by the temperature sensor is higher than a first preset standard temperature or not after receiving a control signal, which corresponds to an air conditioning mode, from the temperature control lever angle sensor;

determining whether the interior temperature is higher than a second preset standard temperature or not, in a state that the interior temperature is higher than the first preset standard temperature;

controlling an opening mode of the conduits by turning on the relay and by completely closing the cooling water inlet conduit and the cooling water outlet conduit and by fully opening the cooling water bypass, in a state that the interior temperature is higher than the second preset standard temperature; and controlling an opening mode of the cooling water bypass by turning on the relay and by opening the cooling water bypass in accordance with the increase of the interior temperature, in a state that the interior temperature is higher than the first preset standard temperature and also is lower than the second preset standard temperature.

8. The method for controlling a vehicle heater control apparatus according to claim 7, wherein in the step of controlling an opening mode of the cooling water bypass, opening positions of the first and second conduit guide pins are controlled by changing the voltage of an electric source flowing along the solenoid coil of the cooling water conduit control part via the relay.

9. The method for controlling a vehicle heater control apparatus according to claim 7, wherein the first preset standard temperature is about −5° C. and the second preset standard temperature is about 20° C.

* * * * *